United States Patent
Chung et al.

[11] Patent Number: 6,114,433
[45] Date of Patent: Sep. 5, 2000

[54] PTC CONDUCTIVE POLYMER COMPOSITION

[75] Inventors: Chia-Tin Chung, Miao-Li Hsien; Bin-Yuan Lin, Hsin-Chu Hsien; Hsin-Herng Wang; Hsiao-Pin Huang, both of Hsin-Chu, all of Taiwan

[73] Assignee: Industrial Technology Research Institute, Hsin-Chu Hsien, Taiwan

[21] Appl. No.: 09/132,473

[22] Filed: Aug. 11, 1998

[30] Foreign Application Priority Data

Mar. 17, 1998 [TW] Taiwan .................................. 87103966

[51] Int. Cl.⁷ .............................. C08K 3/04; C08K 3/10; C08K 3/14; C08K 3/36; H01B 1/24
[52] U.S. Cl. ........................... 524/495; 524/424; 524/428; 524/492; 524/496; 523/215; 252/502; 252/504
[58] Field of Search ..................... 524/495, 496, 524/424, 428, 492; 523/215; 252/502, 504

[56] References Cited

U.S. PATENT DOCUMENTS

| | | | |
|---|---|---|---|
| 5,098,610 | 3/1992 | Okamura et al. | 524/496 |
| 5,174,924 | 12/1992 | Yamada et al. | 524/495 |
| 5,246,783 | 9/1993 | Spenadel et al. | 526/943 |
| 5,373,046 | 12/1994 | Okamura et al. | 524/496 |
| 5,556,697 | 9/1996 | Flenniken | 524/496 |
| 5,672,297 | 9/1997 | Soane | 252/500 |
| 5,747,164 | 5/1998 | Miyakawa et al. | 524/495 |
| 5,747,563 | 5/1998 | Flenniken et al. | 523/215 |

FOREIGN PATENT DOCUMENTS

| | | |
|---|---|---|
| 2469429 | 5/1981 | France . |
| 697533 | 11/1979 | U.S.S.R. . |

*Primary Examiner*—Tae Yoon
*Attorney, Agent, or Firm*—Sughrue, Mion, Zinn, Macpeak & Seas, PLLC

[57] ABSTRACT

A novel PTC conductive polymer composition is disclosed, which comprises (a) 35 to 60%, by weight of the composition, of a branched polyolefin with a polydispersity index of less than 2.5; and (b) 20 to 45%, by weight of the composition, of conductive particles which have been dispersed in the polyolefin. The PTC composition of the invention has intense, reproducible PTC behavior and is particularly suitable for use in PTC thermistors.

18 Claims, No Drawings

PTC CONDUCTIVE POLYMER COMPOSITION

BACKGROUND OF THE INVENTION

1. Field of the Invention

The present invention relates to a conductive polymer composition exhibiting positive temperature coefficient (PTC) behavior. More particularly, it relates to a PTC composition which has intense, reproducible PTC behavior. The PTC composition is particularly useful in PTC thermistors.

2. Description of the Related Arts

PTC conductive polymer compositions are known for use in circuit protection devices and self-limiting or self-regulating heaters.

In the conventional art, PTC compositions are prepared by cross-linking a polymer component thereof by radiation or by chemical cross-linkers. For instance, Polym. Eng. Sci. 44, 532 (1973) shows a method of producing a PTC composition by blending high-density polyethylene (HDPE) and carbon black, followed by curing the HDPE with a peroxide initiator. However, such a method is high-cost and there are chemical residues which may corrode metal electrodes. Further more, the cross-linked polymer has inferior moldability and less intense PTC behavior owing to the higher degree of crosslinking density and the poor degree of crystallinity.

U.S. Pat. No. 5,545,679 discloses a PTC conductive polymer composition which uses thermosetting polyester resin combined with conductive fillers. However, the compositions using thermosetting resins as a polymer matrix have the drawbacks of being poor in PTC intensity and moldability.

U.S. Pat. No. 4,591,700 teaches a PTC conductive polymer composition which contains a mixture of two crystalline polymers of different melting points, where the melting point of one polymer is at least 160° C. and at least 25° C. higher than the melting point of the other polymer. In such a composition, the conductive particles are liable to segregate in the fusion state, thereby resulting in negative temperature coefficient (NTC) behavior. Moreover, the conductive particles are prone to segregate at the grain boundaries when the polymer is being crystallized, thus making the PTC behavior of the composition irreproducible.

In addition, the PTC polymer compositions of the prior art have generally failed to provide satisfactory adhesion to metal electrodes or to percolate a large quantity of carbon black and/or inorganic fillers.

SUMMARY OF THE INVENTION

It is therefore an object of the invention to solve the aforementioned problems and provide a PTC conductive polymer composition which has not only intense but also highly reproducible PTC behavior.

Another object of the invention is to provide a PTC conductive polymer composition whose preparation does not necessitate a cross-linking procedure.

A further object of the invention is to provide a PTC conductive polymer composition having superior moldability.

We have discovered that the above objects can be attained by blending a branched polyolefin having a polydispersity index of less than 2.5, and conductive particles (e.g. carbon black). Accordingly, the PTC conductive polymer composition of the invention comprises:

(a) 35 to 60%, by weight of the composition, of a branched polyolefin with a polydispersity index of less than 2.5; and (b) 20 to 45%, by weight of the composition, of conductive particles which have been dispersed in said polyolefin.

The PTC composition of the invention can further include (c) an adhesion polymer which provides adhesion to Al, Cu, or Ni electrodes; and (d) a particulate filler which is electrically non-conductive but thermally high-conductive.

According to a feature of the invention, this improved PTC composition uses a branched, high-nucleation-density polyolefin, which has a large number of grain boundaries that allow the conductive particles to reside therein. Using the high-nucleation-density polyolefin as a polymer matrix benefits the PTC composition in other ways. A large quantity of carbon black and the inorganic particles can reside at the fine grain boundaries of such polymers, enabling the composition to percolate a greater amount of carbon black and inorganic particles. Further, owing to the high nucleation density, the fusion temperature is very close to the crystallization temperature, and the heat of fusion is lesser. Accordingly, the response time of PTC thermistors produced thereby would be faster.

According to another feature of the invention, the PTC composition is prepared without a cross-linking procedure. This can reduce the operational cost and avoid the production of chemical residues that might corrode the electrodes.

According to a further feature of the invention, the PTC composition may further contain a polymeric material to provide better adhesion to metal electrodes.

DETAILED DESCRIPTION OF THE INVENTION

In the composition of the invention, the branched polyolefin with a polydispersity index of less than 2.5 preferably has a density of about 0.865 to 0.935 g/cm$^2$, a melting point between 50° C. and 128° C., and a fusion heat of at least 50 J/g. Suitable polyolefins include polyethylene, polypropylene, ethylene/propylene terpolymer (EPDM), polypropylene/polyethylene copolymer, and the like. The amount of the polyolefin component is generally within the range of about 35 to 60% by weight of the composition. As the amount of the polyolefin increases, it becomes more difficult to obtain a composition having a sufficiently low resistivity at room temperature. On the other hand, if the amount of the polyolefin decreases, it will become more difficult to obtain a composition having intense PTC behavior. The amount of the branched polyolefin is preferably between 40 and 55% by weight of the composition.

The conductive particles suitable for use in the invention can be metallic particles, but are preferably carbon black. The carbon black can be either the graphitizing or non-graphitizing type. The carbon black used herein preferably has a particle size of 5 to 75 nm. The carbon black is preferably pre-treated by a low-molecular-weight, water-soluble carbon black treating agent, such as polyvinyl alcohol (PVA), polyethylene glycol (PEG), polyethylene oxide (PEO), ethylene/vinyl alcohol copolymer (EVOH), or a mixture thereof. The pre-treatment can be achieved by simply agitating the carbon black with the treating agent in an appropriate proportion. The amount of conductive particles is generally within the range of about 20 to 45% by weight of the composition. As the amount of the conductive particles increases, it becomes difficult to obtain a composition having satisfactory PTC behavior. On the other hand, a lesser amount of the conductive particles leads to an undesirably high resistivity at room temperature. The amount of the conductive particles is preferably between 35 and 40% by weight of the composition. The amount of the carbon black treating agent is preferably between 1 and 10% by weight of the composition.

In order to improve the adhesion between the PTC composition and the metal electrodes, the composition may further comprise an adhesion polymer, e.g., a maleic anhydride-grafted or acrylic acid-grafted polyolefin, an epoxy resin, or a glycidyl methacrylate/polyolefin copolymer. The amount of the adhesion polymer is preferably within the range of 5 to 20% by weight of the composition.

The composition may in addition contain an antioxidant, a fire retardant, and a particulate filler which is electrically non-conductive but thermally high-conductive. A particulate filler having a heat transfer coefficient of at least 5 W/m.K, a resistivity of at least $10^{15}$ ohm-cm, and an average size at least 10 times greater than that of the conductive particles is preferred. Suitable particulate fillers include inorganic fillers, e.g. AlN, SiC, and $SiO_2$. The particulate filler is preferably in an amount of 25 to 40% by weight of the composition.

The composition of the invention can be processed by blending a branched polyolefin and a pre-treated carbon black in a kneader or extruder, followed by blending the first blend and the rest of the components, e.g. the particulate filler, antioxidant, and fire retardant together, also in a kneader or extruder.

The invention is described in greater detail with reference to the following non-limiting examples.

EXAMPLE 1

The ingredients and amounts thereof given in Table 1 were used in this Example.

TABLE 1

| INGREDIENTS | SAMPLE 1 | SAMPLE 2 |
| --- | --- | --- |
| Branched Polyethylene with a polydispersity index of 2.28 | 41 wt% | 45 wt% |
| Carbon black (Black Pearls 3700, Cabot) | 23 wt% | 35 wt% |
| Polymeric adhesive (Modic E 100H, Mitsubishi Chemical Corp.) | 17 wt% | 9 wt% |
| AlN powders (FX-50WRS from Art) | 13.9 wt% | 5.2 wt% |
| Carbon black treating agent (PEG 400, Merck) | 3 wt% | 3.5 wt% |
| Fire retardant (Dechlorane Plus 25, Oxychem) | 0.7 wt% | 0.8 wt% |
| Antioxidant (Irganox 1010, Ciba Ceigy) | 1.4 wt% | 1.5 wt% |

PTC elements of sample Nos. 1 and 2 were prepared by the following procedures. The branched polyethylene, and the carbon black, pre-treated by PEG 400, were dry-blended in an extruder. The dried blend was further blended with the polymeric adhesive, inorganic particles, antioxidant, and fire retardant and then melt-extruded into a tape of 0.5 mm thickness using a T-shaped die. Nickel foil electrodes were laminated on opposite sides of the tape, and the volume resistivity and the PTC intensity were measured through the thickness of the sample. The results of the measurements are summarized in Table 2 and Table 3 below.

TABLE 2

| INGREDIENTS | SAMPLE 1 | SAMPLE 2 |
| --- | --- | --- |
| $\rho_{25}$ (ohm-cm) | 7.5 | 9.3 |
| PTC intensity*2 | 6.5 | 6.9 | room temp. volume resistivity;
*PTC intensity = $\log(\rho_{max}/\rho_{min})$; in which $\rho_{max}$ is the maximum volume resistivity; and $\rho_{min}$ is the minimum volume resistivity.

TABLE 3

| | SAMPLE 1 | | SAMPLE 2 | |
| --- | --- | --- | --- | --- |
| Test cycles | $\rho_{25}$ (ohm-cm) | PTC intensity | $\rho_{25}$ (ohm-cm) | PTC intensity |
| 5 | 7.8 | 6.4 | 9.5 | 6.8 |
| 15 | 8.2 | 6.3 | 9.6 | 6.7 |
| 300 | 8.7 | 6.3 | 9.6 | 6.7 |

EXAMPLE 2

The ingredients and amounts thereof given in Table 4 were used in this Example.

TABLE 4

| INGREDIENTS | SAMPLE 3 | SAMPLE 4 |
| --- | --- | --- |
| Branched Polyethylene with a polydispersity index of 2.03 | 43 wt% | 47 wt% |
| Carbon black (Black Pearls 3700, Cabot) | 35 wt% | 32 wt% |
| Polymeric adhesive (Modic E 100H, Mitsubishi Chemical Corp.) | 19 wt% | 15 wt% |
| Carbon black treating agent (PEG 400, Merck) | 0.5 wt% | 0.5 wt% |
| Fire retardant (Dechlorane Plus 25, Oxychem) | 0.9 wt% | 0.9 wt% |
| Antioxidant (Irganox 1010, Ciba Geigy) | 1.6 wt% | 1.6 wt% |

PTC elements of sample Nos. 3 and 4 were prepared by the same procedures as in Example 1 except that no inorganic particles were added. The volume resistivity and the PTC intensity of the PTC elements thus obtained were measured and are summarized in Table 5 and Table 6.

TABLE 5

| | SAMPLE 3 | SAMPLE 4 |
| --- | --- | --- |
| $\rho_{25}$ (ohm-cm) | 11.3 | 12.5 |
| PTC intensity | 7.1 | 6.9 |

TABLE 6

| | SAMPLE 3 | | SAMPLE 4 | |
| --- | --- | --- | --- | --- |
| Test cycles | $\rho_{25}$ (ohm-cm) | PTC intensity | $\rho_{25}$ (ohm-cm) | PTC intensity |
| 5 | 12.7 | 7.0 | 12.9 | 6.8 |
| 15 | 14.1 | 6.9 | 13.1 | 6.7 |
| 300 | 14.3 | 6.8 | 13.4 | 6.7 |

EXAMPLE 3

The ingredients and amounts thereof given in Table 7 were used in this Example.

TABLE 7

| INGREDIENTS | SAMPLE 1 | SAMPLE 2 |
|---|---|---|
| Branched Polyethylene with a polydispersity index of 2.35 | 46.5 wt% | 49.4 wt% |
| Carbon black (Vulcan xC72, Cabot) | 40.2 wt% | 45.3 wt% |
| Polymeric adhesive (Modic E 100H, Mitsubishi Chemical Corp.) | 6.3 wt% | 0 wt% |
| Fire retardant (Dechlorane Plus 25, Oxychem) | 3.5 wt% | 3.7 wt% |
| Antioxidant (Irganox 1010, Ciba Geigy) | 3.9 wt% | 1.6 wt% |

PTC elements of sample Nos. 5 and 6 were prepared by the following procedures. The branched, crystalline polyethylene and the carbon black were melt kneaded in a kneader and then pelletized by a plastic pelletizer. The resulting pellets were further blended with the polymeric adhesive, antioxidant, and fire retardant in an extruder and melt-extruded into a tape of 0.5 mm thickness using a T-shaped die. Nickel foil electrodes were laminated on opposite sides of the tape and the volume resistivity and the PTC intensity were measured through the thickness of the sample. The results of the measurements are summarized in Table 8 and Table 9 below.

TABLE 8

|  | SAMPLE 5 | SAMPLE 6 |
|---|---|---|
| $\rho_{25}$ (ohm-cm) | 12.7 | 11.4 |
| PTC intensity | 5.8 | 5.5 |

TABLE 9

|  | SAMPLE 3 | | SAMPLE 4 | |
|---|---|---|---|---|
| Test cycles | $\rho_{25}$ (ohm-cm) | PTC intensity | $\rho_{25}$ (ohm-cm) | PTC intensity |
| 5 | 13.7 | 5.5 | 13.7 | 5.3 |
| 15 | 14.3 | 5.4 | 14.5 | 5.2 |
| 300 | 14.5 | 5.4 | 14.5 | 5.1 |

Comparative Example

The ingredients and amounts thereof given in Table 7 were used in this Comparative Example.

TABLE 7

| INGREDIENTS | SAMPLE 1 | SAMPLE 2 |
|---|---|---|
| Low density polyethylene (NA-248, USI Far East Corp.) | 46.5 wt% | 50.2 wt% |
| Carbon black (Vulcan xC72, Cabot) | 40.3 wt% | 44.7 wt% |
| Polymeric adhesive (Modic E 100H, Mitsubishi Chemical Corp.) | 5.6 wt% | 0 wt% |
| Fire retardant (Dechlorane Plus 25, Oxychem) | 3.7 wt% | 3.8 wt% |
| Antioxidant (Irganox 1010, Ciba Geigy) | 3.9 wt% | 1.3 wt% |

PTC elements of sample Nos. 7 and 8 were prepared by the following procedures. The low-density polyethylene (LDPE) and the carbon black were melt-kneaded in a kneader and then pelletized by a plastic pelletizer. The pellets were blended with the polymeric adhesive, antioxidant, and fire retardant in an extruder and again pelletized. The resulting pellets were hot-pressed to obtain a sheet and shaped. Nickel foil electrodes were laminated on opposite sides of the shaped sheet and the volume resistivity and the PTC intensity were measured through the thickness of the sample; the results are listed in Table 10. The PTC elements obtained from Examples 1–3 and Comparative Example were tested for their moldability, elongation rate, tensile strength, flexibility, and percolation. These testing results are also summarized in Table 10.

TABLE 10

| Sample No. | Moldability[1] | Elongation rate[2] | Tensile strength (kg/cm$^2$)[2] | Percolation of carbon black | Flexibility[1] (break or not) | $\rho_{25}$ (ohm-cm)[4] | PTC intensity[4] |
|---|---|---|---|---|---|---|---|
| 1 | Good | 6.23% | 264.8 | Good | Not break | 8.7 | 6.3 |
| 2 | Good | 5.98% | 259.8 | Good | Not break | 9.6 | 6.7 |
| 3 | Good | 6.14% | 279.5 | Good | Not break | 14.3 | 6.8 |
| 4 | Good | 6.29% | 254.3 | Good | Not break | 13.4 | 6.7 |
| 5 | Good | 5.88% | 279.3 | Good | Not break | 14.5 | 5.4 |
| 6 | Good | 6.25% | 278.9 | Good | Not break | 14.5 | 5.1 |
| 7 | Bad | 0.16% | 30.2 | Bad | Break | 37.8 | 3.0 |
| 8 | Bad | 0.08% | 18.5 | Bad | Break | 40.6 | 2.9 |

[1]evaluation according to a 0.5 mm-thick tape
[2]determined by ASTM D 638-91 Type 1
[3]a 100 × 10 × 1 mm tape was folded up to test its flexibility
[4]value of 300th test cycle

What is claimed is:

1. A PTC conductive polymer composition, comprising:
   35 to 60%, by weight of the composition, of a branched polyolefin with a polydispersity index of less than 2.5; and
   20 to 45%, by weight of the composition, of conductive particles which have been dispersed in said polyolefin,
   wherein the PTC conductive polymer composition has a PTC intensity of at least 5.1 and a volume resistivity of not greater than 14.5 ohm-cm when measured at 25° C.

2. The composition as claimed in claim 1, wherein said branched polyolefin has a density of about 0.865 to 0.935 g/cm$^2$; a melting point between 50° C. and 128° C.; and a fusion heat of at least 50 J/g.

3. The composition as claimed in claim 1, wherein said conductive particles are carbon black.

4. The composition as claimed in claim 3, wherein said carbon black is graphitizing.

5. The composition as claimed in claim 3, wherein said carbon black is non-graphitizing.

6. The composition as claimed in claim 1, further comprising a, water-soluble carbon black treating agent.

7. The composition as claimed in claim 6, wherein said carbon black treating agent is selected from the group consisting of polyvinyl alcohol, polyethylene glycol, polyethylene oxide, and ethylene/vinyl alcohol copolymer.

8. The composition as claimed in claim 6, wherein said carbon black treating agent is about 1 to 10% by weight of the composition.

9. The composition as claimed in claim 1, wherein said polyolefin is about 40 to 55% by weight of the composition.

10. The composition as claimed in claim 1, wherein said conductive particles are about 35 to 45% by weight of the composition.

11. The composition as claimed in claim 1, further comprising an adhesion polymer which provides adhesion to aluminum, copper, or nickel electrodes.

12. The composition as claimed in claim 11, wherein said polymeric material is a maleic anhydride-grafted polyolefin or an acrylic acid-grafted polyolefin.

13. The composition as claimed in claim 11, wherein said polymeric material is an epoxy resin or a glycidyl methacrylate/polyolefin copolymer.

14. The composition as claimed in claim 11, wherein said polymeric material is about 5 to 20% by weight of the composition.

15. The composition as claimed in claim 11, further comprising a particulate filler which is electrically non-conductive but thermally high-conductive.

16. The composition as claimed in claim 11, wherein said thermally high-conductive particulate filler consists of inorganic particles having a heat transfer coefficient of at least 5 W/m.K; a resistivity of at least $10^{15}$ ohm-cm; and an average size at least 10 times greater than that of said conductive particles.

17. The composition as claimed in claim 16, wherein said inorganic particles are selected from the group consisting of AlN, SiC, and $SiO_2$.

18. The composition as claimed in claim 16, wherein said particulate filler is about 25 to 40% by weight of the composition.

* * * * *